(12) United States Patent
Chambliss

(10) Patent No.: US 6,311,726 B1
(45) Date of Patent: Nov. 6, 2001

(54) WATER PRESSURE CONTROL

(76) Inventor: Jerald A. Chambliss, 5656 Ballentine Pike, Springfield, OH (US) 45502

( * ) Notice: Subject to any disclaimer, the term of this patent is extended or adjusted under 35 U.S.C. 154(b) by 0 days.

(21) Appl. No.: 09/480,666

(22) Filed: Jan. 11, 2000

Related U.S. Application Data
(60) Provisional application No. 60/118,565, filed on Feb. 3, 1999.

(51) Int. Cl.$^7$ ........................................... E03B 1/00
(52) U.S. Cl. ........................ 137/613; 251/264; 277/308; 184/6.18
(58) Field of Search ............................ 137/613; 251/318, 251/264; 277/308; 184/6.18

(56) References Cited

U.S. PATENT DOCUMENTS

| | | |
|---|---|---|
| 787,327 | 4/1905 | Dworzek . |
| 1,837,001 | 12/1931 | White . |
| 2,067,335 | 1/1937 | Pardee . |
| 3,530,891 | 9/1970 | Welland . |
| 5,282,493 | 2/1994 | Schwartz et al. . |
| 5,598,902 | * 2/1997 | Lin ...................................... 184/45.1 |
| 5,771,921 | 6/1998 | Johnson . |
| 5,831,158 | 11/1998 | Schloetterer et al. . |
| 5,992,444 | * 11/1999 | Junttila ............................ 251/264 X |

FOREIGN PATENT DOCUMENTS

| | | |
|---|---|---|
| 453531 | 12/1927 | (DE) . |
| 1 565 649 | 4/1980 | (GB) . |

* cited by examiner

Primary Examiner—Kevin Lee
(74) Attorney, Agent, or Firm—Richard C. Litman

(57) ABSTRACT

An apparatus to control the flow rate of water between two pressurized areas, particularly for metered delivery of water to the packing of a pump's stuffing box. The object of the invention is to increase the useful life of the shaft of a process pump or centrifugal pump or any pump that maintains a stuffing box with standard packing material. The shaft is maintained by providing a steady drip-flow of water to the packing of a stuffing box, which helps to keep the packing moist and elastic, rather than brittle. Optimal moisture content of the packing lubricates the pump shaft, keeps the shaft at the proper temperature, and maintains the packing for a proper shaft seal, so as to prevent moisture from entering the gear box, or other locations that will cause permanent damage to the pump machinery. The water flow is controlled principally by a pressure-sensitive adjustment screw, having a soft-touch adjustment rubber gasket at its end. The adjustment screw and rubber gasket optimizes the flow rate of the packing water as a function of the pressure differential between the inlet pressure and the stuffing box pressure.

10 Claims, 3 Drawing Sheets

WATER PRESSURE CONTROL

CROSS-REFERENCE TO RELATED APPLICATION

This application claims the benefit of U.S. Provisional patent application Ser. No. 60/118,565, filed Feb. 3, 1999.

BACKGROUND OF THE INVENTION

1. Field of the Invention

The present invention relates to stuffing box packing systems used in industrial pumps, most notably, process or centrifugal pumps. More particularly, the invention controls the rate of water flow, as a function of pressure, to process pump stuffing boxes, in order to optimize the functioning and increase the longevity of the packing around the pump shaft.

2. Description of Related Art

To maintain in good working order the packing or braided, rope-type, packing squares, in the stuffing box around the shaft of an industrial pump has been a persistent problem in the food service, milling, chemical, injection molding, mixing, refinery (grinding) and other industries that move large volumes of material. The packing around the shaft of the pump must be kept moist with water so that the stuffing box serves its intended function to properly cool, lubricate and seal the pump shaft, and protect surrounding parts.

One of the biggest problems in the past has been caused by over-flushing of the packing material, which results in outward migration of elasticizers from the fibers of the packing material. As a result, the packing becomes brittle, loses its own lubricant and ultimately, the packing itself can tear away at the shaft, and must be replaced.

Another problem caused by the over-flushing of water into the packing is that when water leaks out from the packing, it can travel to the gear box, cause bearing failure, with the result that the pumps must then be rebuilt.

Finally, over-flushing of the stuffing box raises economic and ecological considerations, both of which remain a concern with respect to those methods used today for providing water flow to industrial pumps.

Patents directed towards the control of the flow and pressure of water or other fluids, among others, include: U.S. Pat. No. 787,327 issued to G. H. Dworzek, U.S. Pat. No. 1,837,001 issued to J. C. White, U.S. Pat. No. 5,282,493 issued to Schwartz et. al, U.S. Pat. No. 5,771,921 issued to Johnson, U.S. Pat. No. 5,831,158 issued to Schloetterer et. al. and Great Britain Pat. No. 1,565,649.

None of the above inventions and patents, taken either singly or in combination, is seen to describe the instant invention as claimed.

SUMMARY OF THE INVENTION

Accordingly, it is a principal object of the invention to increase the useful life of the shaft of a process pump or centrifugal pump or, any pump that maintains a stuffing box with standard packing material, e.g. braided, rope-type, etc. The application may also include stuffing boxes associated with hydropower.

It is another object of the invention to maintain the packing with a steady drip-flow of water to keep the packing moist and elastic, but not so moist that the elasticizers migrate out of the packing, causing it to become brittle. Optimal moisture content of the packing lubricates the pump shaft, keeps the shaft at the proper temperature, and maintains the packing for a proper shaft seal, so as to prevent moisture from entering the gear box or other locations that would cause permanent damage to the pump machinery. Furthermore, limiting the flow of water to the stuffing box of an industrial pump, to a rate no greater than that which is required to insure its proper functioning, has both economic and ecological benefits rooted in conservation.

It is a further object of the invention to employ a pressure-sensitive adjustment screw, having a "soft-touch adjustment" gasket at the screw end, so as to optimize the flow rate of the packing water as a function of the pressure differential between the inlet pressure and the stuffing box pressure. A tough rubber gasket on the adjustment screw end also prevents damage to the bore, such as that which may be found in connection with the use of a needle valve, or a mechanical seal.

Still another object of the invention is to provide proper seals throughout the adjustment screw housing assembly.

Finally, it is an object of the invention to maintain additional safety features such as a check valve to stop the back flow when the inlet pressure decreases or shuts off; and two corresponding ball valves which enable an operator to change the pressure gauges while the machinery is still running.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
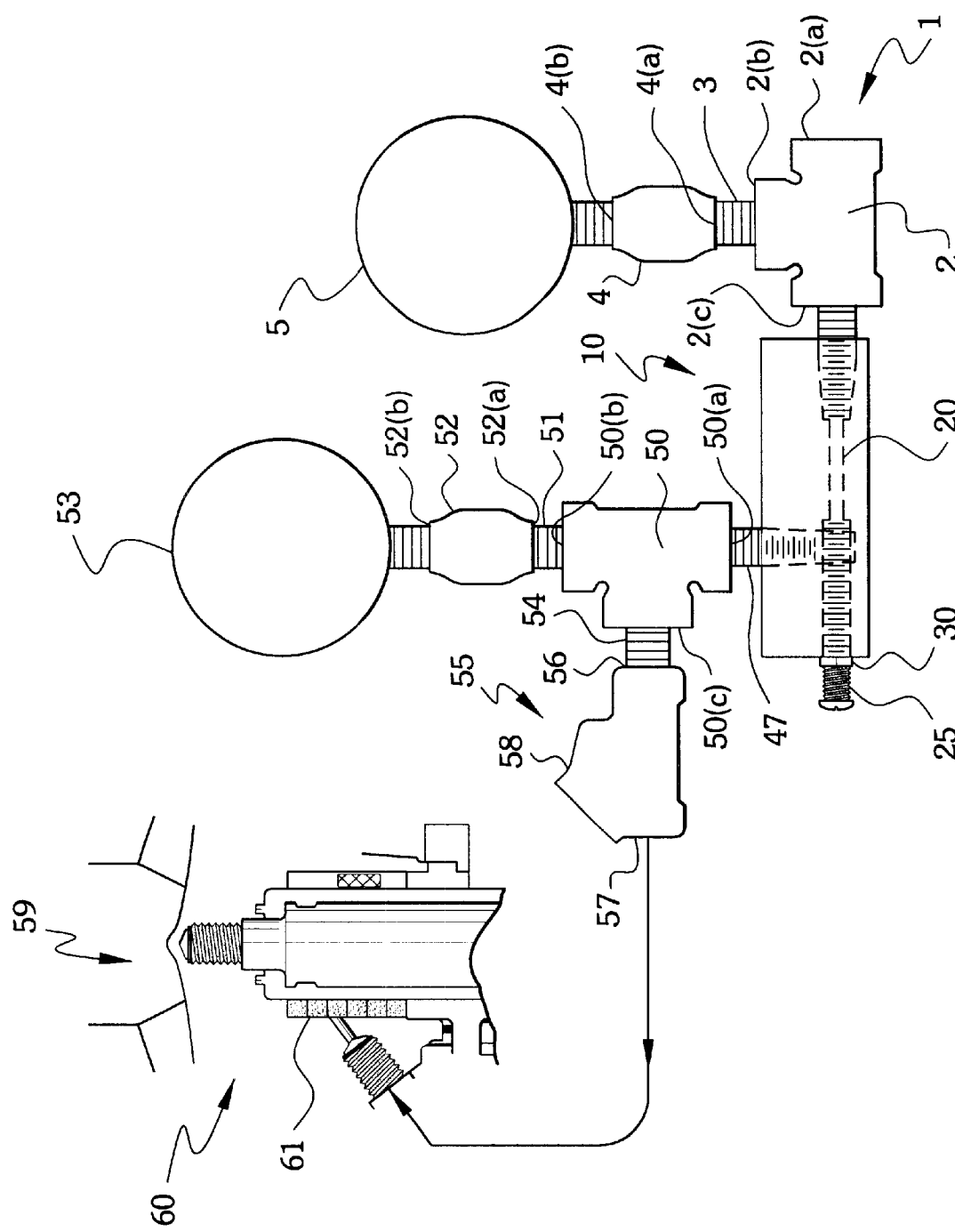
FIG. 1 is an environmental perspective view of a water control system with a water pressure and flow regulator connected, at the outlet, to a process pump having a stuffing box.

The present invention is for controlling the flow of fluid, preferably water. The preferred application of the invention is for controlling the flow of water to the packing in the stuffing box 60 of a centrifugal or process pump 59. FIG. 1 is an environmental perspective view of the preferred embodiment as incorporated into one such system. The elements of FIG. 1 are described below in the order associated with the path of flow.

A first T-joint 2, preferably of galvanized steel, and having three openings (2a, 2b, and 2c), serves as the entry way 1 of water into the device. Adjacent to entry way 1, opening 2b is connected by galvanized piping 3 to a first ball valve 4 having a first end 4a connected to piping 3, and a second end 4b connected to an inlet pressure gauge 5. Ball valve 4 stops water from flowing to pressure gauge 5, so that gauge 5 can be changed while the machinery of pump 59 is still operating.

Figure 2:
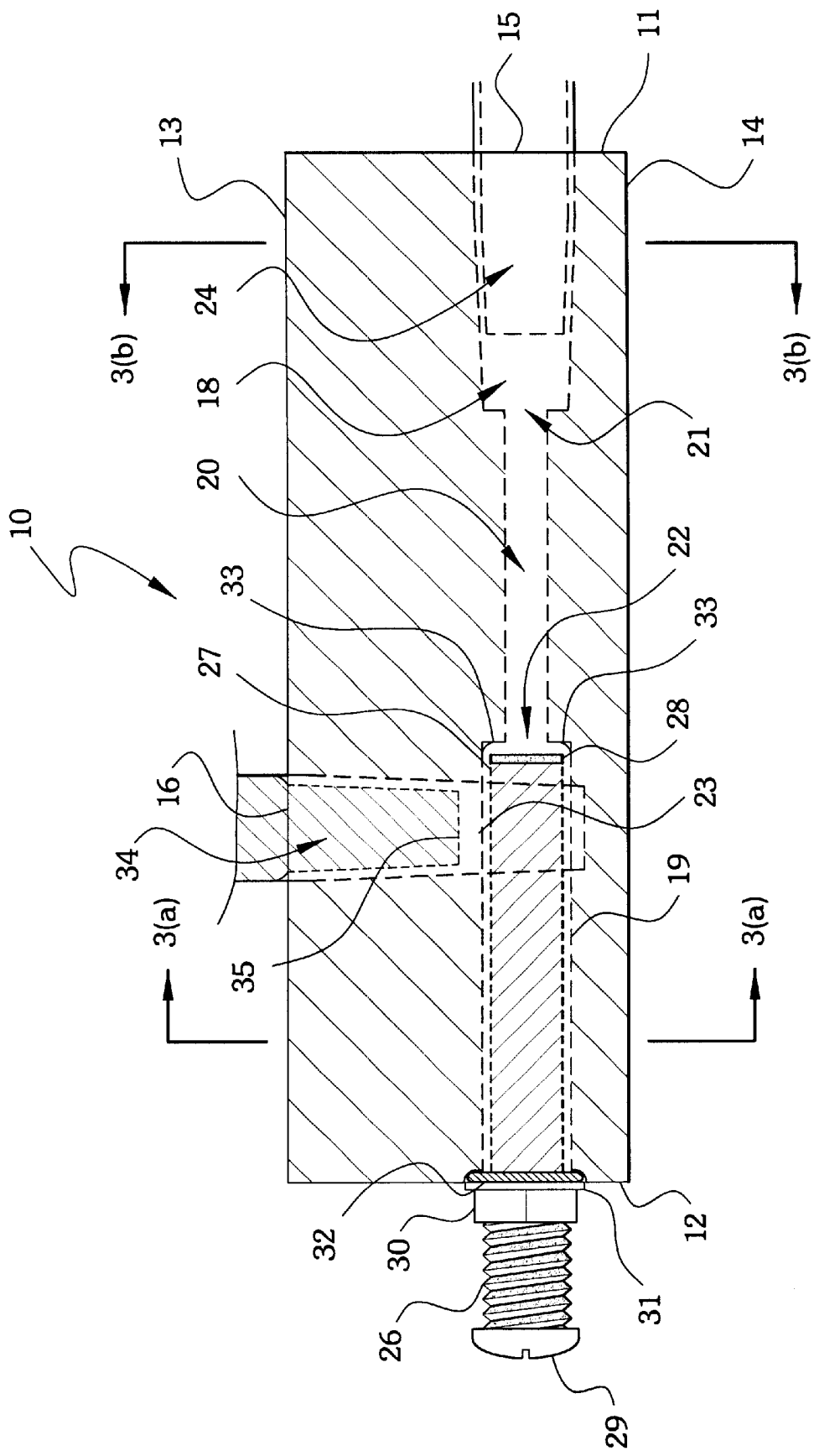
FIG. 2 is a detailed section view of the brass housing containing the fine adjustment screw.
Figure 3A:
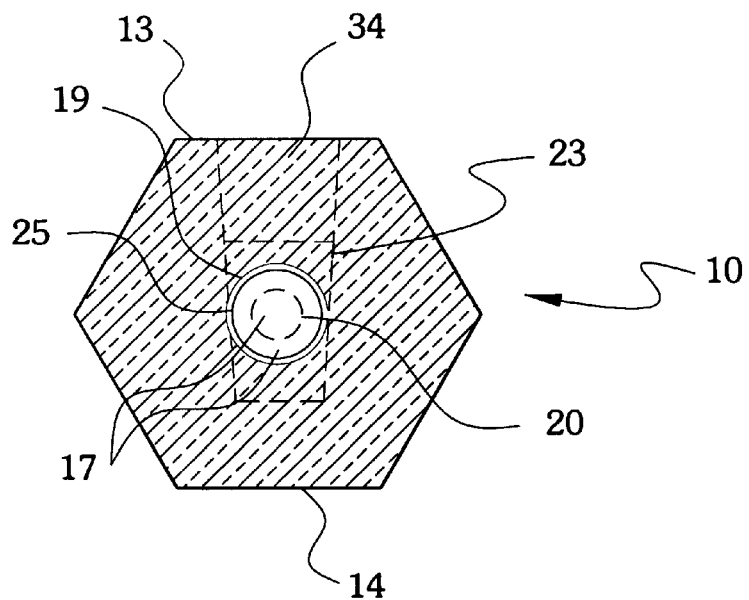
FIG. 3(a) is a section view through the solid brass housing along line 3(a)—3(a) of FIG. 2.
Figure 3B:
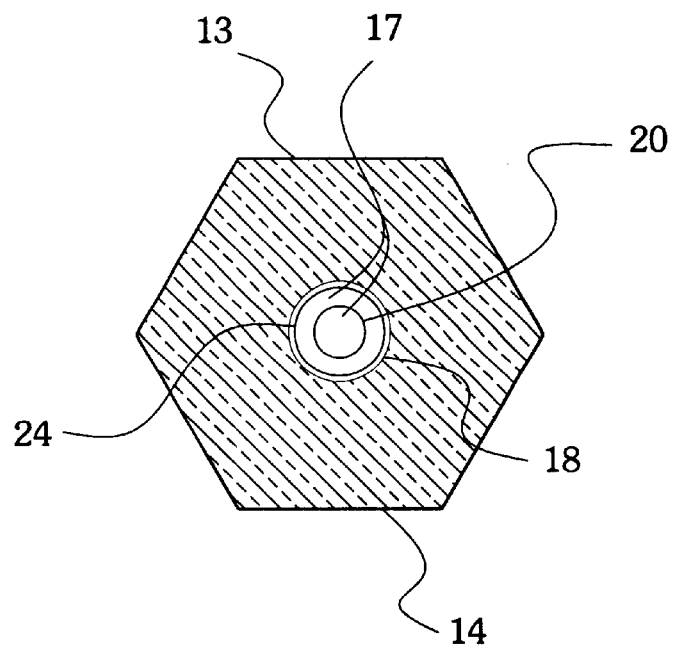
FIG. 3(b) is an opposing section view along line 3(b)—3(b) of FIG. 2, providing a view through the housing and horizontal piping bore.

FIGS. 2, 3(a) and 3(b) reveal the features of housing 10 in greater detail. FIG. 2 is a detailed view of the preferred housing, comprising an elongated, hexagonal, brass housing 10 for controlling water flow. The hexagonal shape is advantageous for two reasons. First, it enables better clamping force onto housing 10 for the purposes of machining tunnels and bores within housing 10. Second, a hexagonal shape reduces the amount of material required to produce housing 10, because a solid hexagon, having bores therethrough, has greater structural integrity than a four-sided housing of equal mass. A rounded shape would not work as well because one would be drilling into a radius wall as opposed to the flat surface of a hexagon, which provides better sealing qualities that are critical in high-pressure applications, and better machining as well.

Housing 10 has a first end 11 and a second end 12 defining therebetween a longitudinal axis. In the preferred embodiment, housing 10 is brass, one inch in height by three inches in length along the longitudinal axis. Housing 10 could also be made of cast iron or steel. The housing 10 has a top surface 13 and a bottom surface 14. Top surface 13 is parallel to bottom surface 14. Housing 10 also has an inlet 15 through first end 11, and an outlet 16 proximate second end 12 and entering the top surface 13 of housing 10.

Housing 10 has a tunnel 17 formed between first end 11 and second end 12. Tunnel 17 has a circular cross section at any plane normal to the longitudinal axis of housing 10. Tunnel 17 contains three distinct segments, including an inlet bore 18 through first end 11, an adjustment screw bore 19 through second end 12, and a waterway 20 extending therebetween. Waterway 20 has an inlet end 21 proximate said inlet bore 18, and a screw end 22 proximate said adjustment screw bore 19.

Inlet bore 18 is formed as a truncated threaded cone tapering towards waterway 20. It is approximately ¾" in length, and has a diameter which tapers from approximately ⁹⁄₁₆" to ⁷⁄₁₆". Waterway 20 is formed as a hollow, smooth cylinder, and has a cross-sectional diameter of preferably ⅛", but may have a diameter of up to ⅜". In either case, the diameter of waterway 20 is less than that of inlet bore 18, and less than that of adjustment screw bore 19. Adjustment screw bore 19 is formed as a threaded cylinder, of ¼–20" tap (SAE).

Outlet bore 23 extends through the top surface 13 of housing 10, proximate second end 12 of housing 10. Outlet bore 23 has the same dimensions as inlet bore 18. Outlet bore 23 is formed as a truncated threaded cone tapering from top surface 13 to reach within ¼" of bottom surface 14 of housing 10. Outlet bore 23 partially intersects adjustment screw bore 19 at more than ½" from top surface 13.

Inlet piping nipple 24, conical in shape, is threaded into inlet bore 18 to a point proximate to inlet end 21 of waterway 20. Fine adjustment screw 25, preferably stainless steel, has two ends, a head end 26 proximate second end 12 of housing 10 and a tail end 27 proximate screw end 22 of waterway 20. Adjustment screw 25, cylindrical in shape, is threaded into adjustment screw bore 19 such that its tail end 27 abuts shoulder 33.

Shoulder 33 has dimensions defined by the difference in diameters between said adjustment screw bore 19 and waterway 20, and is located at the demarcation between bore 19 and waterway 20.

A disc-shaped, gasket 28 is affixed, preferably adhered, to tail end 27 of adjustment screw 25. Gasket 28 is a tough, durable, preferably rubbery material, preferably neoprene, and is adhered to screw 25 preferably with 404 LOCTITE™. Thus, gasket 28 is seated between the tail end of adjustment screw 25 and shoulder 33, and is wedgable by screw 25 against shoulder 33. Gasket 28 is slightly larger in diameter than waterway 20 in order to perform a "soft touch adjustment." A soft touch adjustment enables optimal control over the high-pressure water flow through housing 10. Preferably, gasket 28 is slightly larger in diameter (³⁄₁₆") than the inside diameter (¹³⁄₆₄") of screw 25, but is slightly smaller than the outside diameter (¼") of screw 25. The inside diameter of screw 25 is defined as the diameter of its shank without the threads. The outside diameter of screw 25 is defined as the diameter of its shank with the threads. Gasket 28 operates in response to a function of the pressure differential between the inlet pressure and the stuffing box pressure. The pressure differential causes a flexing of gasket 28, and a consequential, pressure-induced, release of water. Such a gasket makes possible the "soft-touch adjustment." The gasket is a substitute for a mechanical seal at the junction of the adjustment screw 25 and the waterway 20, where flow is controlled. Alternately, gasket 28 could complement a mechanical seal, rather than replace the mechanical seal.

A screw head 29 is located at the head end of adjustment screw 25. As it is torqued, screw head 29 acts against stainless steel jam nut 30. Jam nut 30, in turn, acts against vulcanized rubber washer 31. An O-ring 32 between washer 31 and housing end 12 helps to seal bore 19.

Outlet piping nipple 34, conical in shape, is threaded into outlet bore 23, and has a base 35 which extends into housing 10 so as not to break the upper plane of said adjustment screw bore. Piping nipple 24 and piping nipple 34 preferably have teflon tape on their threads to effectuate a maximum seal.

Referring to FIG. 3(a), a section view through the solid brass housing 10 and adjustment screw bore 19 reveals a ⅛" waterway 20 in the background. Note that brass housing 10, in section view, is hexagonal, and that tunnel 17 and adjustment screw 25 are collinear with the narrower waterway 20.

As shown in FIGS. 3(a) and 3(b), both screw 25 and waterway 20 preferably extend longitudinally through the center of housing 10. Alternately, both screw 25 and waterway 20 could be set off (slightly to the left and below the centerline of the hexagon) from the vertically oriented piping nipple 23.

Referring again to FIG. 1, above brass housing 10 and connected to outlet pipe 47, is a second T-joint 50, again, preferably of galvanized steel and having three openings (50a, 50b, and 50c). Opening 50a receives water exiting from outlet pipe 47 of housing 10. Opening 50b, opposite opening 50a, is connected by galvanized piping 51 to a second ball valve 52, having a first end 52a connected to the piping 47, and a second end 52b, connected to a stuffing box pressure gauge 53. Ball valve 52 stops water from flowing to the pressure gauge 53, so that gauge 53 can be changed while the machinery associated with pump 59 is still running. Gauge 53 measures the stuffing box 60 pressure. The inlet pressure must be greater than the stuffing box pressure in order for gasket 28 on the tail end of adjustment screw 25 to work. The reason for this is because the pressure differential (between inlet 1 and stuffing box 60) will bear a critical deforming force against the adjustment screw 25 gasket 28.

Opening 50c of T-joint 50 is connected by a galvanized pipe 54 to a check valve 55 having a front end 57 and back end 56, through which water flows. The check valve also has a top portion 58, which serves to stop any back flow as a safety feature, when the mill or inlet pressure shuts off. Operably connected to the front end 57 of check valve 55 is process pump 59, having a stuffing box 60 containing packing 61. After exiting front end 57, water enters the stuffing box and is distributed through a port and lantern ring to the packing of the stuffing box 60.

The best method of operating the device disclosed herein would include inserting new packing 61 into stuffing box 60 of pump 59. Once new packing is in place, the adjustment screw 25 is backed out approximately one inch from the second end 12 of housing 10. This allows packing 61 to be flushed with water until it is saturated. The next step is to screw in the adjustment screw 25 at head 29. This will cause the gasket 28 to bear against shoulder 33, such that an optimum drip rate may be achieved. When an optimum drip rate is achieved, the jam nut 30 is tightened, together with the washer and O-ring, against second end 12 of housing 10.

It is to be understood that the present invention is not limited to the sole embodiments described above, but encompasses any and all embodiments within the scope of the following claims.

I claim:

1. An elongated, fluid control device, comprising:
    a solid housing, comprising:
        a first end opposite a second end;
        a flat top surface and a flat bottom surface opposite said top surface;
        an inlet through said first end, and an outlet proximate said second end;
        a tunnel formed through said housing from said first end to said second end, said tunnel defining a longitudinal axis of said housing and having a circular cross section at any plane normal to said longitudinal axis, said tunnel comprising an inlet bore extending into said housing from said first end, an adjustment screw bore extending into said housing from said second end, and a smooth shank cylindrical waterway connecting said inlet bore to said adjustment screw bore, said waterway having a cross-sectional diameter less than or equal to the diameter of the inlet bore and less than the diameter of the adjustment screw bore, said waterway having an inlet end proximate said inlet bore, and a screw end proximate said adjustment screw bore, said inlet bore formed as a truncated threaded cone tapering towards said waterway, said adjustment screw bore formed as a threaded cylinder;
        a shoulder, defined by the difference in diameter between, and located at the juncture of, said adjustment screw bore and said waterway;
        an outlet bore formed through a surface of said housing proximate said second end, and having the shape of a truncated threaded cone tapering in the direction from said top surface to said bottom surface, said outlet bore communicating with and intersecting said adjustment screw bore;
    a conical inlet piping having an inlet nipple threaded into said inlet bore proximate said inlet end of said waterway;
    a fine adjustment screw having a head end proximate said second end and a tail end threaded into said adjustment screw bore proximate said shoulder;
    a disc-shaped, rubber gasket affixed to said tail end of said adjustment screw, said gasket sandwiched between said tail end of said adjustment screw and said shoulder;
    a screw head at said head end of said adjustment screw;
    a jam nut adjacent said screw head, an O-ring between said screw head and said second end, and a washer therebetween;
    a conical outlet piping nipple threaded into said outlet bore, said nipple extending a distance into said housing proximate but not intersecting said adjustment screw bore.

2. A pressure-sensitive, fluid control device according to claim 1, wherein said housing is brass.

3. A pressure-sensitive, fluid control device according to claim 1, wherein said housing is cast iron.

4. The device according to claim 1 wherein a cross section of the exterior of said housing, in a plane normal to said longitudinal axis, is hexagonal in shape.

5. The device according to claim 1, wherein said washer has vulcanized rubber backing to accomplish a proper seal.

6. The device according to claim 1, wherein said outlet is through said top surface.

7. The device according to claim 1, wherein teflon tape is wrapped on all pipe threads for optimum sealing.

8. The device according to claim 1, wherein said gasket is slightly larger in diameter than said waterway, but slightly smaller than the outside diameter of said adjustment screw.

9. The device according to claim 1, further comprising:
    a first T-joint connected to said inlet piping;
    a first ball valve having a first end and a second end, said first end of said first ball valve connected to said first T-joint;
    an inlet pressure gauge connected to said second end of said first ball valve;
    a second T-joint connected to said outlet piping;
    a second ball valve having a first end and a second end, said first end of said second ball valve connected to said second T-joint;
    a second pressure gauge connected to said second end of said second ball valve;
    a check valve having a front end and a back end, said back end of said check valve connected to said second T-joint, said check valve being adapted for connection to a pump.

10. A method of operating a fluid pressure control, comprising:
    inserting new packing in a process pump;
    backing out an adjustment screw approximately one inch from a second end of a water pressure control housing;
    waiting for said packing to flush with water until said packing is saturated;
    screwing in said adjustment screw such that a rubber gasket on its tail end bares against a waterway shoulder, such that an optimum drip rate is achieved; and
    tightening a jam nut, a washer, and an O-ring to accomplish a seal between said adjustment screw and said housing.

* * * * *